Jan. 3, 1967  F. SHORE  3,295,674
PRESENTATION MOUNTS PERTAINING TO MATS
Filed June 26, 1964  3 Sheets-Sheet 1
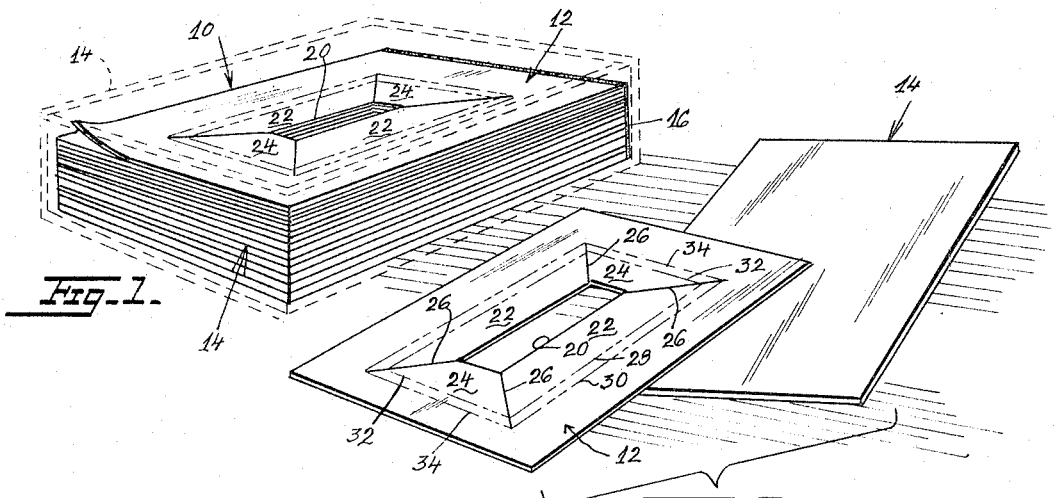
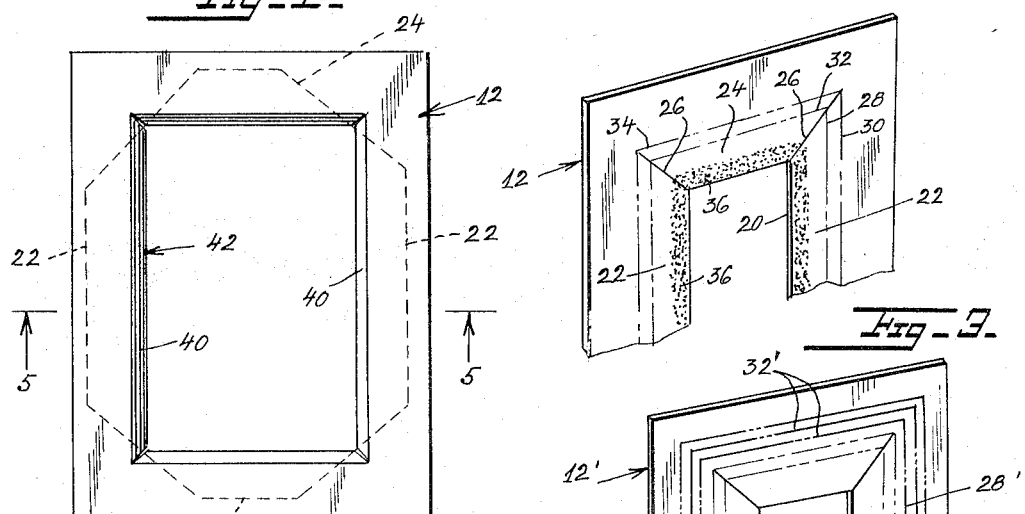
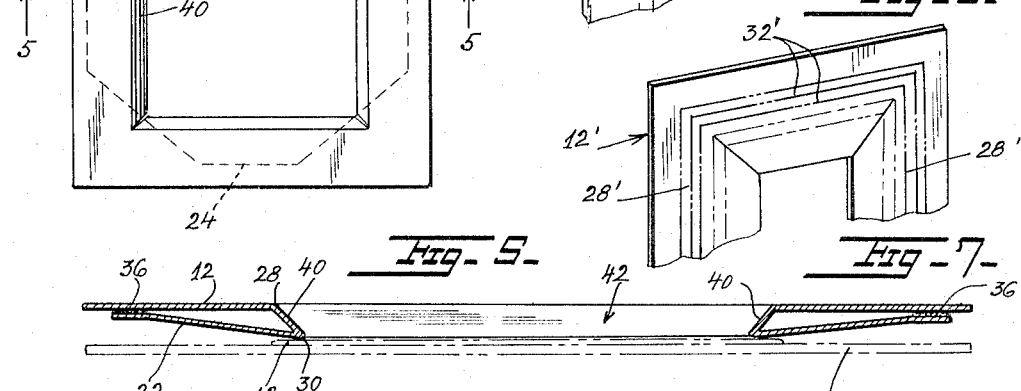
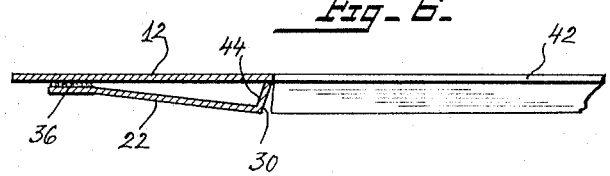
INVENTOR.
Frank Shore
BY Polachek & Saulsbury
ATTORNEYS.

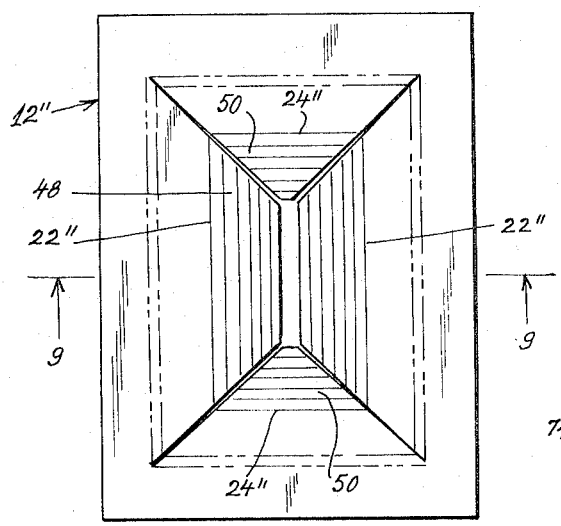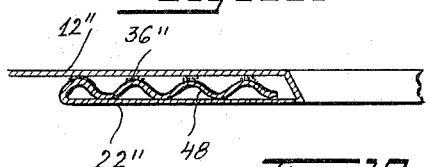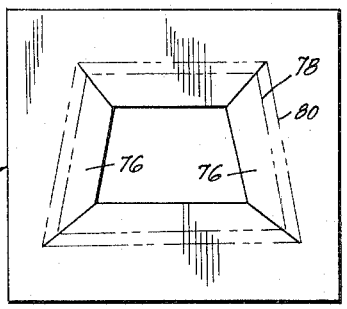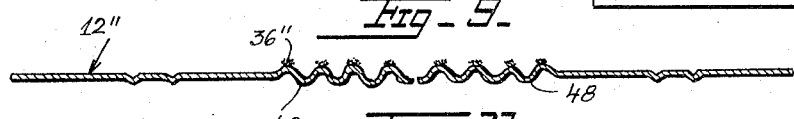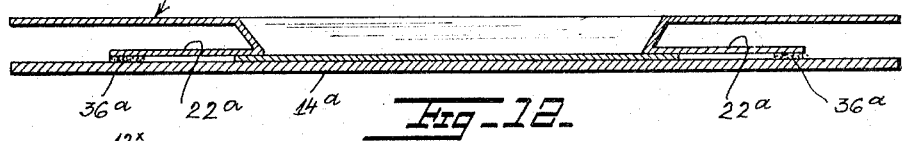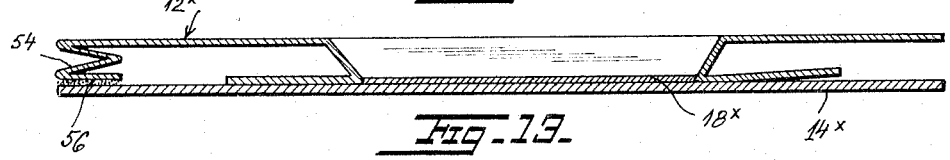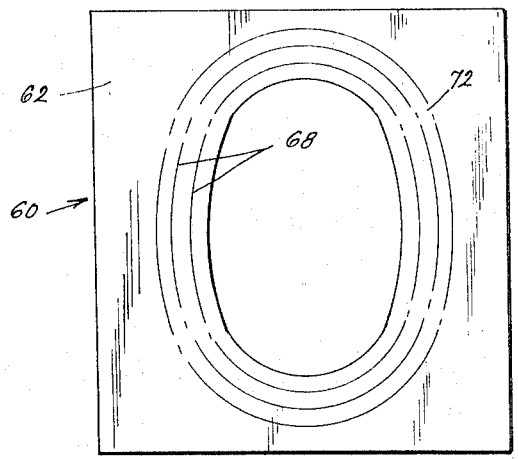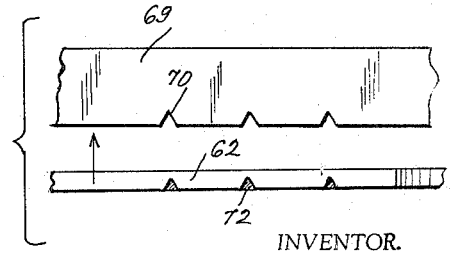

Jan. 3, 1967  F. SHORE  3,295,674
PRESENTATION MOUNTS PERTAINING TO MATS
Filed June 26, 1964
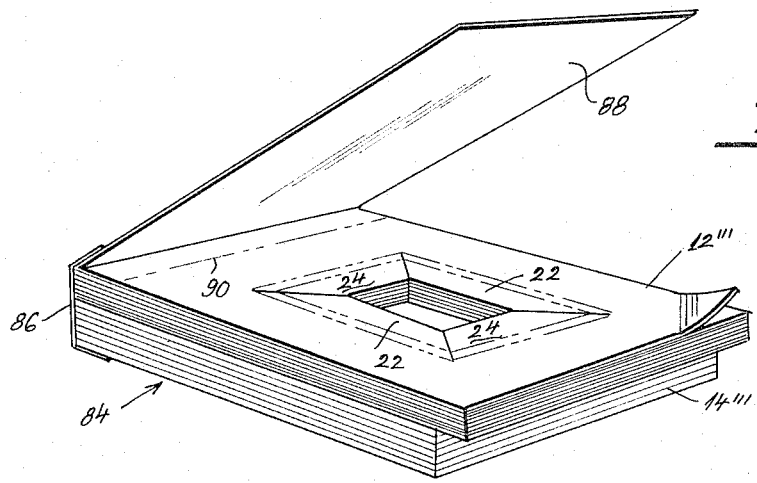
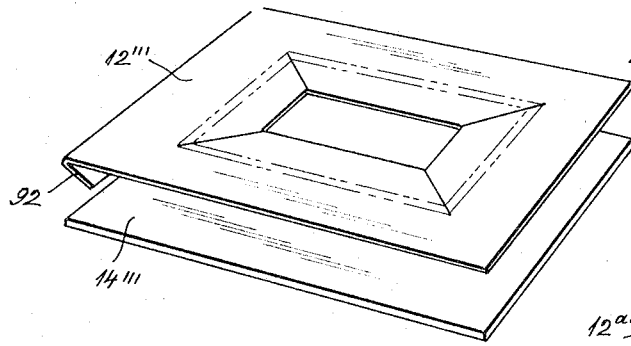
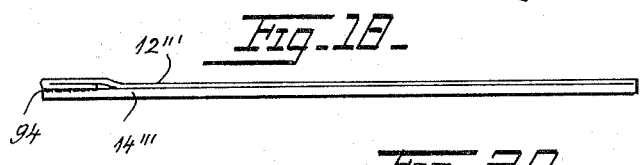
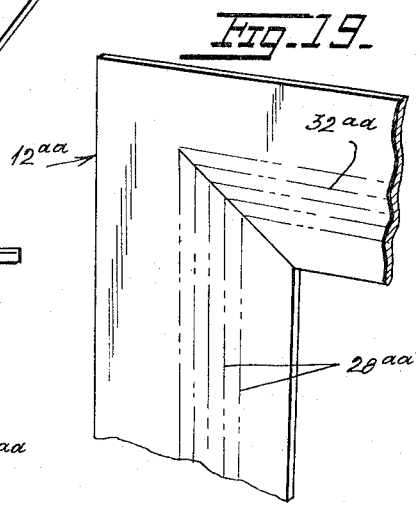
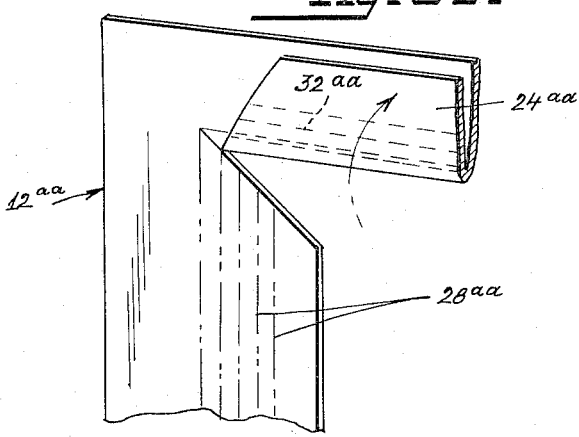
INVENTOR.
Frank Shore
BY Polachek & Saulsbury
ATTORNEYS.

United States Patent Office 3,295,674
Patented Jan. 3, 1967

3,295,674
PRESENTATION MOUNTS PERTAINING TO MATS
Frank Shore, 26 Lantern Road, Hicksville,
Long Island, N.Y. 12108
Filed June 26, 1964, Ser. No. 378,466
2 Claims. (Cl. 206—56)

This invention relates generally to picture frames and more particularly to mats or presentation mounts for pictures which can be readily adapted to have different size openings and bevels.

A principal object of the present invention is to provide a pad of mats and presentation mounts and backing boards for pictures formed of inexpensive material such as paper board, paper, leatherette and similar inexpensive materials.

Another object of the invention is to provide a picture frame assembly consisting of a backing board and mat or presentation mount formed of inexpensive materials.

A further object of the invention is to provide a mat or presentation mount for a picture formed of paper board which will have a finished appearance and produce the illusion of expensive tooled work upon the finished frame.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a top perspective view of a pad of mats or presentation mounts and backing boards embodying the invention, the pad being shown in a container, the container being shown in dash lines, a corner edge of the topmost mount being shown turned up.

FIG. 2 is a top perspective disassembled view of a mat or presentation mount and backing board assembly.

FIG. 3 is a rear perspective view of a portion of the mat or presentation mount.

FIG. 4 is a top plan view of a mat or presentation mount in assembled condition, the folded flaps being shown in dash lines.

FIG. 5 is a cross-sectional view taken on the line 5—5 of FIG. 4.

FIG. 6 is a view similar to FIG. 5 of a portion of a mat or presentation mount showing the bevel eliminated.

FIG. 7 is a rear perspective view of the top portion of a mat or presentation mount embodying another modified form of the invention.

FIG. 8 is a top plan view of a mat or presentation mount embodying yet another modified form of the invention.

FIG. 9 is a cross-sectional view taken on the line 9—9 of FIG. 8, parts being broken away.

FIG. 10 is a fragmentary sectional view of the rear of the mat or presentation mount showing the corrugated flap swung to underlapped operative position.

FIG. 11 is a view similar to FIG. 5 showing a mat or presentation mount embodying a still further modified form of the invention.

FIG. 12 is a similar view showing a mat or presentation mount embodying yet another modified form of the invention.

FIG. 13 is a top plan view of a mat or presentation mount embodying a still further modified form of the invention.

FIG. 14 is a fragmentary side elevational view of a tool for making the weekened lines of the form of mat of FIG. 13 and showing a fragment of the mat with the lines enlarged.

FIG. 15 is a top plan view of a mat or presentation mount embodying a still further modified form of the invention.

FIG. 16 is a top perspective view of a pad of mats or presentation mounts and backing boards embodying a further modified form of the invention.

FIG. 17 is a top perspective disassembled view of an assembly of a mat and backing board, the mat being shown folded over at one end.

FIG. 18 is an edge view of the assembly of FIG. 17 in assembled condition.

FIG. 19 is a fragmentary front perspective view of yet a further modified form of mat.

FIG. 20 is a similar view showing the flap at the top turned back.

Referring now in detail to the various views of the drawings, in FIG. 1 a pad 10 constituting a supply of rectangular-shaped mats or presentation mounts 12 and a supply of similarly shaped backing boards 14, embodying one form of the invention, is shown enclosed in a container 14 for marketing. The mats and boards are formed of flat rectangular-shaped sheets of paper board of various colors. In the event that a heavier or more rigid frame is required the material from which the mat or backing board are made may be modified accordingly. The mats and boards are stuck together by a layer of adhesive 16 applied over one short end edge of the pad. The mats and boards are for assembling in pairs for –framing and exposing a picture 18 usually on paper such as shown diagrammatically in FIG. 5. An equal number of mats and boards are shown with the boards on the bottom. An assembly comprises a single mat or presentation mount and a single backing board as shown in FIG. 2. The mats or presentation mounts 12 are similarly constructed and each comprises a rectangular-shaped paper board body with an elongated narrow opening 20 at the center thereof. The opening is defined by a pair of elongated flaps 22 parallel to the long sides of the body and by a pair of short flaps 24 parallel to the short sides of the body. The ends of the flaps are cut at a slant forming mitre joints 26 between the flaps 22 and 24. Closely spaced fold lines 28 and 30 define the inner long edges of the side flaps 22 and similarly spaced fold lines 32 and 34 define the inner edges of the end flaps 24. A trace of adhesive 36 is applied on the rear surfaces of the flaps adjacent the free edges thereof as shown in FIG. 3.

The body of the mat may be folded slightly along the fold line 30 and 34 in either direction thereby providing a slanting or bevel formation 40 as shown in FIG. 4, and the flaps are folded along the fold lines 28 and 32 and folded rearwardly to juxaposition with the rear surface of the body of the mat and pressed against the body and glued or otherwise secured thereto to secure such flaps in moved position, thereby forming a window 42 in the mat for framing and exposing the picture 18.

The backing board 14 forms the backing of the frame and is constituted by a flat imperforated rectangular sheet of paper board.

In use, in order to form a frame for a picture such as the picture 18, the topmost mat 12 and the lowermost backing board 14 are torn off of the pad 10 to form an assembly or unit as shown in FIG. 2. The flaps 22 and 24 are folded backwardly along the lines 28 and 32 and then along the lines 30 and 34 and the flaps secured to the rear surface of the body of the mount by the adhesive 36 as shown in FIG. 5. This operation forms the window 42 in the mount 12.

In assembling, the picture 18 is placed on top of backing board 14 and the folded mount 12 is placed over the picture thereby framing and exposing the picture as shown in FIG. 5.

In FIG. 6, the flaps 22 are shown swung rearwardly a distance to eliminate the bevel formation 40 of FIG. 4 and provide a straight rearwardly extending edge 44.

In FIG. 7 a modified form of mat 12' is shown that differs from the mat 12 in providing a plurality of parallel fold lines 28' and fold lines 32' so that the size of the window provided in the mat, such as the window 42, may be formed of various sizes.

FIGS. 8 to 10, inclusive, illustrate a mat 12'' embodying another modification of the invention wherein the flaps 22' and 24'' are formed with corrugations 48 and 50, respectively. Adhesive 36'' is applied to the tips of the corrugations at the rear so as to secure the flaps to the rear surface of the mat when swung rearwardly. The corrugations provide thickness for the flaps.

The modified form of mat 12a shown in FIG. 11, differs from the form of mat 12 of FIG. 1 in that the flaps 22a are secured by adhesive 36a to the backing board 14a instead of to the body of the mat 12a.

In the modified form of mat 12x shown in FIG. 12, one long edge of the body of the mat 12x is folded to form a corrugation 54 which is secured to the backing board 14x by adhesive 56. This provides a thickness for the body of the mat.

Referring now to the modified form of mat or presentation mount as shown in FIG. 13, this mount has a rectangular-shaped body 62 with an oval shaped opening 64 in the center thereof. Around the opening, there is series of flaps 66 defined by a series of broken lines 68 formed by a knife 69 formed with spaced notches 70 in its edge, the notches 70 forming solid portions 72 in the body 62. The flaps are adapted to be folded backwardly along the broken lines 68 to form oval windows for framing and exposing the picture.

The modified form of mat or presentation mount 74 shown in FIG. 15 differs from the mat 12 shown in FIG. 2 merely in that the inner side edges of the side flaps 76 and the fold lines 78 and 80 taper downwardly and outwardly.

In FIG. 16, a pad 84 of modified form of mats or presentation mounts 12''' and backing boards 14''' is shown. The mats and boards are adhesively connected together at one end by a strip 86 thereover. The mats are protected by a top cover 88. The mats are stacked on each other and over the boards 14''' which are stacked thereunder. The mats are slightly longer than the boards 14''' but the topmost board is the same length as the mats.

The mats 12''' are similar in construction to the mats 12 except that a fold line 90 is formed thereacross at the inner ends thereof.

In use, a mat 12''' and a board 14''' are removed from the pad and the mat is folded along its fold line 90 to form a fold 92 thereunder. The mat is superimposed on the board and the fold glued to the board as indicated at 94.

FIG. 19 shows a fragment of a modified form of mat 12aa of the same construction as the mat 12' of FIG. 7 except that the cut at the corners extends to the outermost broken fold lines 28aa and 32aa thereby forming mitre joints at the corners of all of the fold lines. In FIG 20, a flap 24aa is formed by turning back the material along the next to the outermost fold line 32aa at the top.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. As an article of manufacture, a pad constituted by a plurality of superimposed similarly sized rectangular-shaped picture frame mats and rectangular-shaped picture frame backing boards removably secured to each other by a layer of adhesive over one short end of the pad, the mats each having a body portion with an elongated rectangular central opening, a plurality of flaps around the opening, said flaps, after the removal of said mats from said pad, being foldable rearwardly through the opening to form a window in the mat for framing and exposing a picture superimposed on the backing board, said flaps having slanted end edges forming mitre joints therebetween, said flaps having adhesive applied to one surface thereof for fastening the flaps to the body of the mat to hold the flaps in folded condition.

2. An article of manufacture as defined in claim 1, wherein the body of the mat has corrugations along one long edge thereof, said corrugations having adhesive thereon for fastening the corrugations to the body of the mat for increasing the thickness of the body of the mat.

References Cited by the Examiner

UNITED STATES PATENTS

| | | | |
|---|---|---|---|
| 2,087,952 | 7/1937 | Klie | 40—154 |
| 2,120,456 | 6/1938 | Barnes | 161—110 X |

LOUIS G. MANCENE, *Primary Examiner.*